United States Patent
Barber

(10) Patent No.: US 7,552,090 B1
(45) Date of Patent: Jun. 23, 2009

(54) METHOD FOR BILLING FOR SERVICES DELIVERED OVER A COMPUTER NETWORK

(75) Inventor: Timothy P. Barber, San Diego, CA (US)

(73) Assignee: Keynetics Inc., Boise, ID (US)

( * ) Notice: Subject to any disclaimer, the term of this patent is extended or adjusted under 35 U.S.C. 154(b) by 0 days.

(21) Appl. No.: 09/368,996

(22) Filed: Aug. 5, 1999

Related U.S. Application Data

(60) Provisional application No. 60/096,304, filed on Aug. 12, 1998.

(51) Int. Cl.
*G06Q 40/00* (2006.01)
(52) U.S. Cl. .......................... 705/40; 705/39
(58) Field of Classification Search ............ 705/32, 705/42, 26, 39–40
See application file for complete search history.

(56) References Cited

U.S. PATENT DOCUMENTS

| | | | | |
|---|---|---|---|---|
| 4,484,217 A | * | 11/1984 | Block et al. ..................... 725/1 |
| 4,774,655 A | * | 9/1988 | Kollin et al. ..................... 707/4 |
| 5,465,206 A | * | 11/1995 | Hilt et al. ..................... 364/406 |
| 5,493,492 A | * | 2/1996 | Cramer et al. ............... 364/406 |
| 5,606,497 A | * | 2/1997 | Cramer et al. ............... 395/232 |
| 5,629,980 A | * | 5/1997 | Stefik et al. ..................... 705/54 |
| 5,640,505 A | * | 6/1997 | Hearn et al. ..................... 714/4 |
| 5,708,780 A | | 1/1998 | Levergood et al. ..... 395/200.12 |
| 5,715,314 A | * | 2/1998 | Payne et al. ..................... 705/78 |
| 5,715,403 A | * | 2/1998 | Stefik ............................ 705/44 |
| 5,724,424 A | | 3/1998 | Gifford ......................... 380/24 |
| 5,737,414 A | * | 4/1998 | Walker et al. .................. 380/4 |
| 5,749,075 A | * | 5/1998 | Toader et al. ................. 705/14 |
| 5,757,917 A | * | 5/1998 | Rose et al. ..................... 705/79 |
| 5,774,869 A | * | 6/1998 | Toader .......................... 705/10 |
| 5,794,221 A | * | 8/1998 | Egendorf ...................... 705/40 |
| 5,881,131 A | * | 3/1999 | Farris et al. ............... 379/15.03 |
| 5,903,652 A | * | 5/1999 | Mital ........................... 380/25 |
| 5,903,881 A | * | 5/1999 | Schrader et al. ............... 705/42 |
| 5,910,987 A | * | 6/1999 | Ginter et al. .................. 380/24 |

(Continued)

OTHER PUBLICATIONS

Rubin, Ian. Personalizing the Internet. Banking Strategies. Sep./Oct. 98, vol. 74, Issue 5 p. 6, 1998.*

(Continued)

*Primary Examiner*—Thu Thao Havan

(57) ABSTRACT

A method of billing (charging) for providing access to information over a computer network, with the billing based on the time a consumer elects to access the information, distinguished primarily by including a third party, called here a bank, to mediate between the consumer and the information vendor in such a way as to relieve the vendor of any involvement in billing the consumer, but leaving the vendor responsible for the quality of the information provided to the consumer. In the method, when a consumer visits a vendor network address and decides to purchase access to information from the vendor, the consumer will exercise a link that will put the consumer in contact with the bank, and so initiate billing, and the bank will then direct the consumer to the location at the vendor (a server operated by the vendor) where the information can be accessed. The method also includes a means by which the bank is made aware of the time at which the consumer finishes accessing the vendor's information, and can thus provide a charge to the consumer based on the time the consumer spends accessing the vendor's information.

12 Claims, 3 Drawing Sheets

U.S. PATENT DOCUMENTS

| | | | | |
|---|---|---|---|---|
| 5,930,777 | A * | 7/1999 | Barber | 705/40 |
| 5,956,697 | A * | 9/1999 | Usui | 705/32 |
| 5,960,416 | A * | 9/1999 | Block | 705/34 |
| 6,016,509 | A * | 1/2000 | Dedrick | 709/224 |
| 6,035,281 | A * | 3/2000 | Crosskey et al. | 705/14 |
| 6,252,869 | B1 * | 6/2001 | Silverman | 370/352 |
| 6,314,386 | B1 * | 11/2001 | Uemura | 702/186 |
| 6,335,927 | B1 * | 1/2002 | Elliott et al. | 370/352 |
| 6,519,571 | B1 * | 2/2003 | Guheen et al. | 705/14 |
| 6,523,022 | B1 * | 2/2003 | Hobbs | 707/3 |
| 6,618,370 | B1 * | 9/2003 | Malik | 370/352 |
| 6,684,333 | B1 * | 1/2004 | Walker et al. | 713/168 |
| 6,879,994 | B1 * | 4/2005 | Matsliach et al. | 709/204 |
| 2004/0093506 | A1 * | 5/2004 | Grawrock et al. | 713/189 |

OTHER PUBLICATIONS

Technology Corner, Retail Delivery News. vol. 3, 23, 1998.*
Sonera Corporation 8 New Network Billing Service From Sonera and Merita. M2 Presswire, 1998.*
Westlaw.com, archived internet site, Apr. 27, 1999, p. 1-7.*
*"Subscrip—An efficient protocol for pay-per-view payments on the Internet," Andreas Furche & Graham Wrightson, Dept. of Computer Science, U. of Newcastle, Oct. 16, 1996, pp. 1-5.
*"PayWord and MicroMint" Two simple micropayment schemes, Ronald Rivest* and Adi Shmir***, *MIT Laboratory for Computer Science, **Weizmann Institute of Science, May 7, 1996, pp. 1-18.
*"iKP—A Family of Secure Electronic Payment Protocols," IBM Research, Mar. 15, 1995 pp. 1.17.
"Mini-Pay: Charging per Clickon the Web," IBM Research-Haifa Research Lab-Tel-Aviv Annex, Oct. 1, 1999,pp. 1-14.
"Millicent:Frequently Asked Questions," Oct. 1, 1999, pp. 1-13.
"Millicent-specific elements for an HTTP payment protocol," Oct. 1, 1999, pp. 1-8.
*"Internet Micro-payment Protocols," by Chris A.Owen, date unknown.
*Downloaded information from "Cookie Central" website on the Internet, downloaded May 30, 1997.
"Micropayment Schemes Promise to Make the Web Profitable—One Penny at a Time," by Eric Brown, NewMedia, Jun. 23, 1997, pp. 1-7.
"Band-width Preserving Method of Charging for Pay-Per-Access Information on a Network," Timothy P. Barber,filed Jul. 11, 1997, pp. 1-17.

* cited by examiner

METHOD FOR BILLING FOR SERVICES DELIVERED OVER A COMPUTER NETWORK

CROSS REFERENCE TO RELATED APPLICATION

Reference is made to and priority claimed from U.S. provisional application Ser. No. 60/096,304, filed Aug. 12, 1998, entitled METHOD FOR BILLING FOR SERVICES DELIVERED OVER A COMPUTER NETWORK.

FIELD OF THE INVENTION

The present invention pertains to billing (charging) for services delivered over a computer network, and in particular to billing (charging) on a per unit time basis for providing access to information over the computer network.

BACKGROUND OF THE INVENTION

When a consumer purchases information over a computer network, in the case that the consumer pays for the information based on how long the consumer maintains access to the information, one obstacle to be overcome is the reluctance of a consumer to trust the vendor supplying the information. The consumer must trust the information vendor in two respects: first, to provide information of acceptable quality, and second, to charge the consumer accurately, based on the time the consumer maintains access to the information.

What is needed is a way to overcome this obstacle and so promote the sale of information over a computer network. Ideally, a method overcoming the obstacle would have various desirable features. One such feature is that the consumer would not need to reveal the consumer's identity to the vendor; providing credit card information to a vendor over a computer network is always a source of concern to consumers. Ideally also, the consumer would not need to trust the information vendor to correctly compute the charge for delivering the paid-for-information services. Further, because today people move from computer location to computer location, the consumer should not have to maintain a single network address to be billed for purchases made at different addresses; the consumer should be able to move from one location to another on the computer network and still be billed as the same entity.

Further still, the consumer should not need any special software. The consumer should have of course the software required to access other locations over the computer network, but should not need software dedicated to billing. In the case that the computer network is the Internet, the purchaser should need a web browser, but ideally, no more. In contrast, the information vendor probably would need some software dedicated to billing, but ideally, this software would be only software for verifying and canceling transactions.

Ideally also, although the vendor does not receive billing information from the consumer, nevertheless the vendor should be solely responsible for actually providing the information being purchased and also responsible for its content. Finally, a consumer should be able to make multiple purchases of access to information from a vendor without having always to re-establish authorization for each different access to information from the same vendor.

SUMMARY OF THE INVENTION

Accordingly, the present invention is a method of billing for providing access to information over a computer network with the charge billed based on the time a consumer elects to access the information, distinguished primarily by including a third party, called here a bank, to mediate between the consumer and the information vendor in such a way as to relieve the vendor of any involvement in billing the consumer, but leaving the vendor responsible for the quality of the information provided to the consumer.

According to the present invention, a vendor establishes an account with the bank and provides to the bank an address on the network, called here a session connect address, which a consumer is to access to acquire information from the vendor. In turn, the bank provides the vendor with a start session address, which is an address of the bank (a server operated by the bank) to which the vendor is to direct a consumer to start the clock for timing access by the consumer to information provided by the vendor. Thus, with this arrangement, when a consumer visits a vendor network address and decides to purchase access to information from the vendor, the consumer will exercise a link that will put the consumer in contact with the bank and so initiate billing, and the bank will then direct the consumer to the location at the vendor (a server operated by the vendor) where the information can be accessed. The method also includes a means by which the bank is made aware of the time at which the consumer finishes accessing the vendor's information, and can thus provide a charge to the consumer based on the time the consumer spends accessing the vendor's information.

Access of the vendor information by the consumer occurs as follows. First, a consumer accesses the network address of a vendor who has set up an account with the bank as described above. In response, the vendor transmits to the consumer a page with a pricetag link. Essentially, the page with the pricetag link provides enough information to the consumer for the consumer to decide whether to look further into purchasing information from the vendor. If the consumer exercises the pricetag link, the consumer machine is directed to the bank, which then returns to the consumer a page of information, called the pricetag page, that includes the price-per-unit time for access to information by the particular vendor, the maximum duration of the connection that the consumer is authorized, and a link to a start session address, which is an address at the bank (i.e. of a server operated by the bank).

If the consumer elects to purchase access to information from the vendor, the consumer exercises the start session link. Then the bank returns to the consumer an end session address, which the consumer can use to terminate the purchase of information from the vendor earlier than waiting for the maximum duration time to expire, and an authentication code. At the same time, the bank can provide to the vendor the consumer authentication code and the consumer address, and notes the time of the exercise of the start session link to begin charging the consumer. In some applications, the bank provides this information to the vendor directly. In other applications, however, the bank redirects the consumer's computer so that it links to the vendor and in so linking passes to the vendor the consumer authentication code and consumer address as parameters of the link process.

In response to receiving the consumer authentication code, the vendor provides to the consumer a page (of network communication) that provides links to various information documents offered by the vendor. (This page is located at the connect address of the vendor.) The consumer may then exercise various of the links to the vendor's information.

In response to the exercise of each link, the vendor provides the consumer with the requested information. The consumer can exercise the end session link at any time or wait until the maximum duration has expired. If the consumer exercises the end session link, the consumer machine is connected to the bank, which then notifies the vendor that the consumer access is terminated, and records the time at which the end session link was exercised to stop charging the consumer.

BRIEF DESCRIPTION OF THE DRAWINGS

The above and other objects, features and advantages of the invention will become apparent from a consideration of the subsequent detailed description presented in connection with accompanying drawings, in which.

DESCRIPTION OF THE PREFERRED EMBODIMENT

Figure 1:
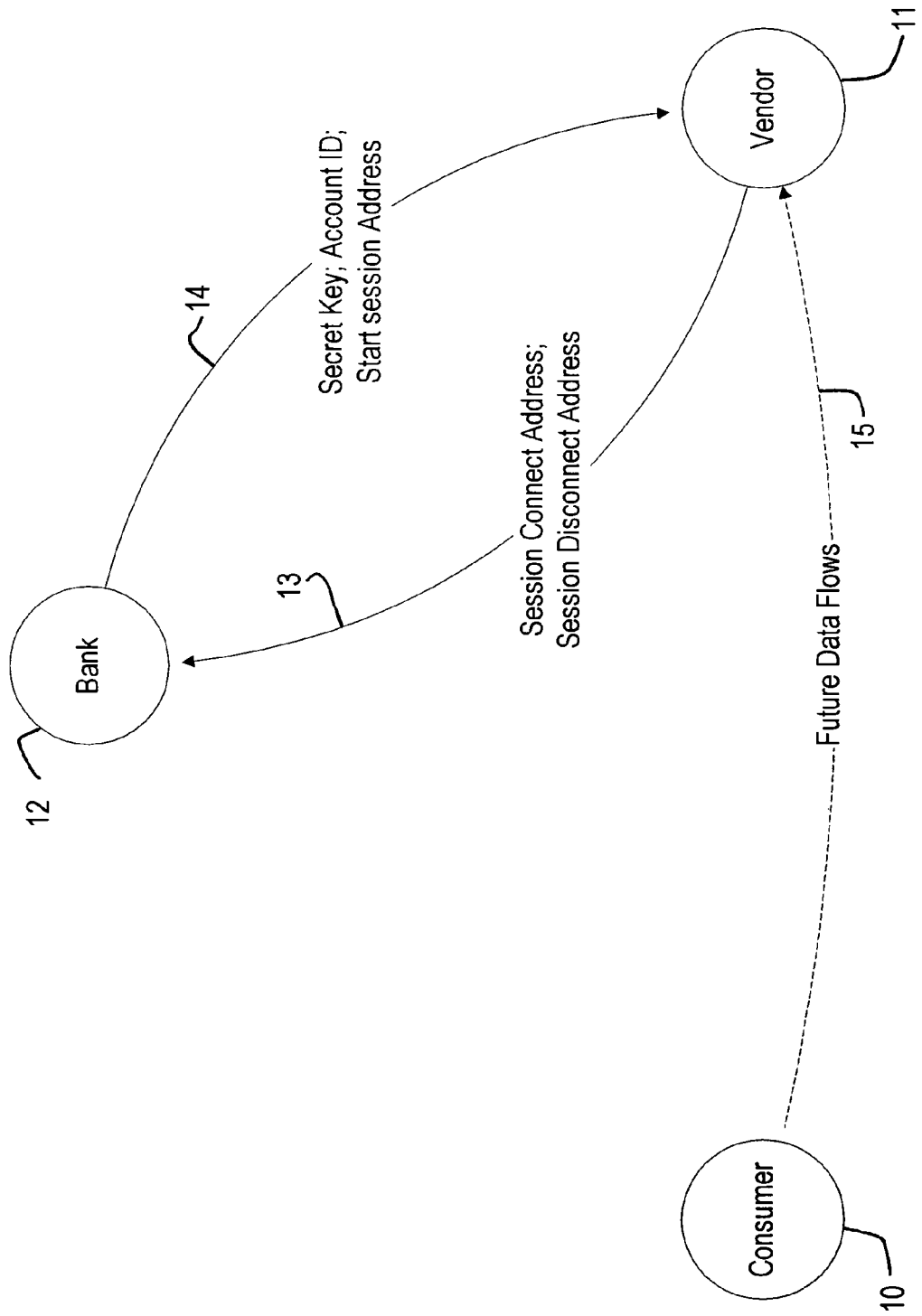
FIG. 1 is a data flow diagram showing a vendor establishing an account with a bank.

Referring now to FIG. 1, according to the present invention a vendor 11 prepares to provide consumers, such as a consumer 10, with information over a computer network, as shown by future data flows 15, by first establishing an account with a bank 12 that acts as an intermediary between the vendor and any consumer 10. In establishing the account, the vendor provides the bank with a session connect address, and a session disconnect address, as shown by data flow 13. The session connect address is where the bank will direct a consumer who has elected to purchase access to information from the vendor, i.e. it is the address of information on a server operated by vendor. As shown by data flow 14, the bank provides the vendor with a secret encryption key, which will be used in verifying an authentication code used to uniquely identify the consumer. The bank also provides the vendor with an account identification and a start session address, i.e. an address on the computer network to which the vendor is to direct a consumer who has elected to purchase access to information in order to start a clock for tracking the time of access to be billed.

Figure 2:
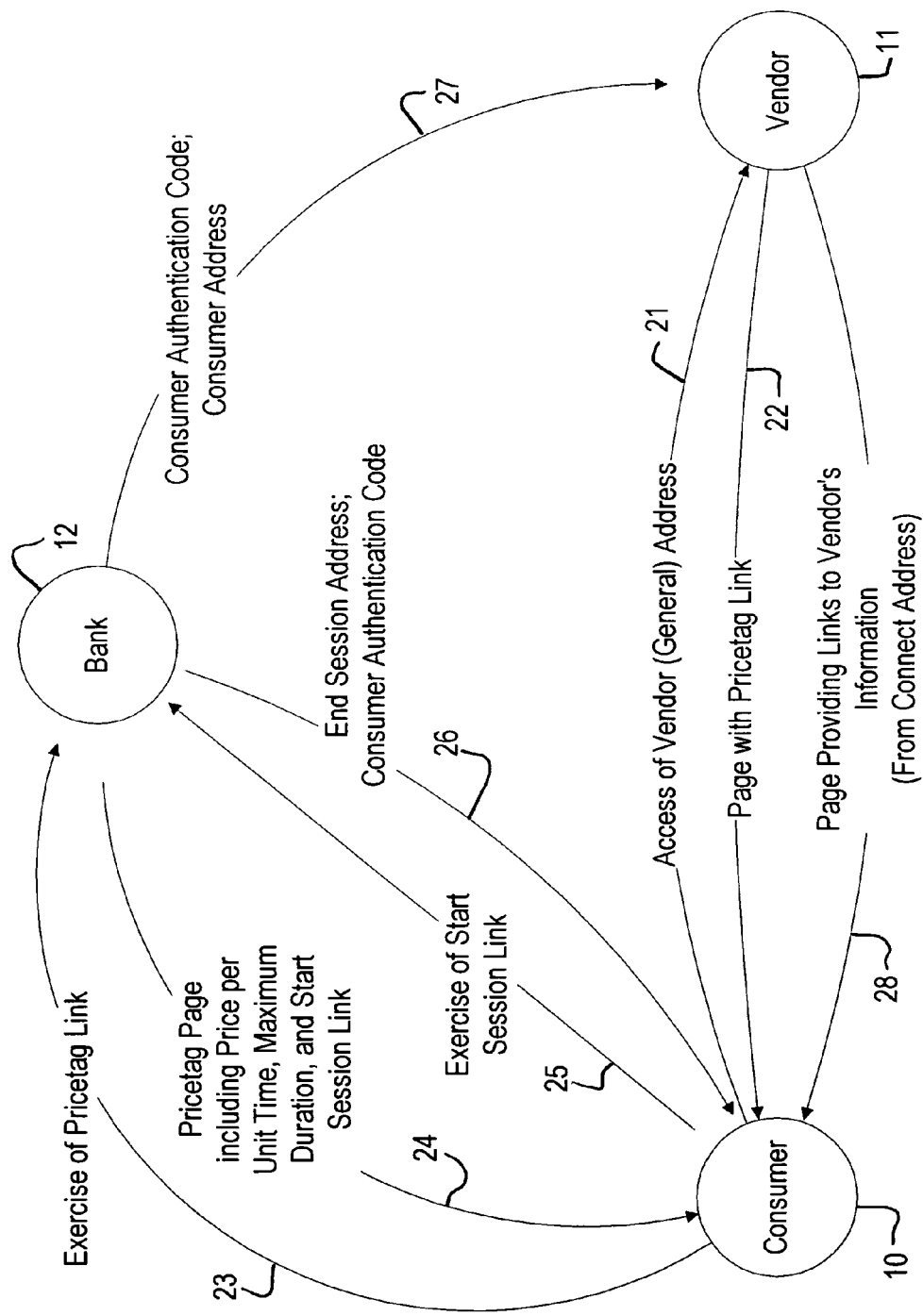
FIG. 2 is a data flow diagram showing a consumer electing to purchase access to information from the vendor.

Referring now to FIG. 2, with an account in place, a consumer 10, as shown by data flow 21, accesses a general address of the vendor 11. In response, the vendor provides the consumer with a page of communication over the network that includes a link to a pricetag, as shown by data flow 22. The consumer examines this page and decides whether to find out more about purchasing information from the vendor. To find out more, the consumer exercises the pricetag link, as shown by data flow 23. If the consumer does exercise the pricetag link, the consumer is actually placed in contact with the bank 12, which then provides to the consumer a page of communication over the computer network, called here the pricetag page, shown as data flow 24. It includes three items: the price-per-unit time of access to the vendor information; the maximum duration of this access beyond which the access will automatically terminate; and a start session link.

If the consumer then decides to purchase access to information from the vendor, the consumer exercises the start session link, as shown by data flow 25, and the bank then provides to the consumer an end session address and an authentication code as shown in data flow 26. The consumer can access the end session address at any time to end a session and to stop the bank from further charging the consumer. At the same time that the bank provides the consumer with the end session address, the bank also provides the vendor with the consumer authentication code and the consumer address, as shown in data flow 27; in the preferred embodiment, the bank does not communicate the consumer authentication code and consumer address directly, although such direct communication is a possible embodiment that would be used in some instances, but instead passes the consumer authentication code and address to the vendor indirectly, through the consumer, by including this information as parameters in the linking of the consumer to the vendor information. Using the consumer address, the vendor provides the consumer with a page of communication over the network that includes links to the vendor's information, as shown in data flow 28. Up to this point, the consumer has elected to purchase access to information and is now being charged, but has yet to access any information documents from the vendor.

When the consumer accesses the start session address (by exercising the start session link,) the bank identifies the consumer by some protocol, which can be based on a log-in and password, a smart card, a challenge response, a digital certificate, IPSEC, or a password token.

Figure 3:
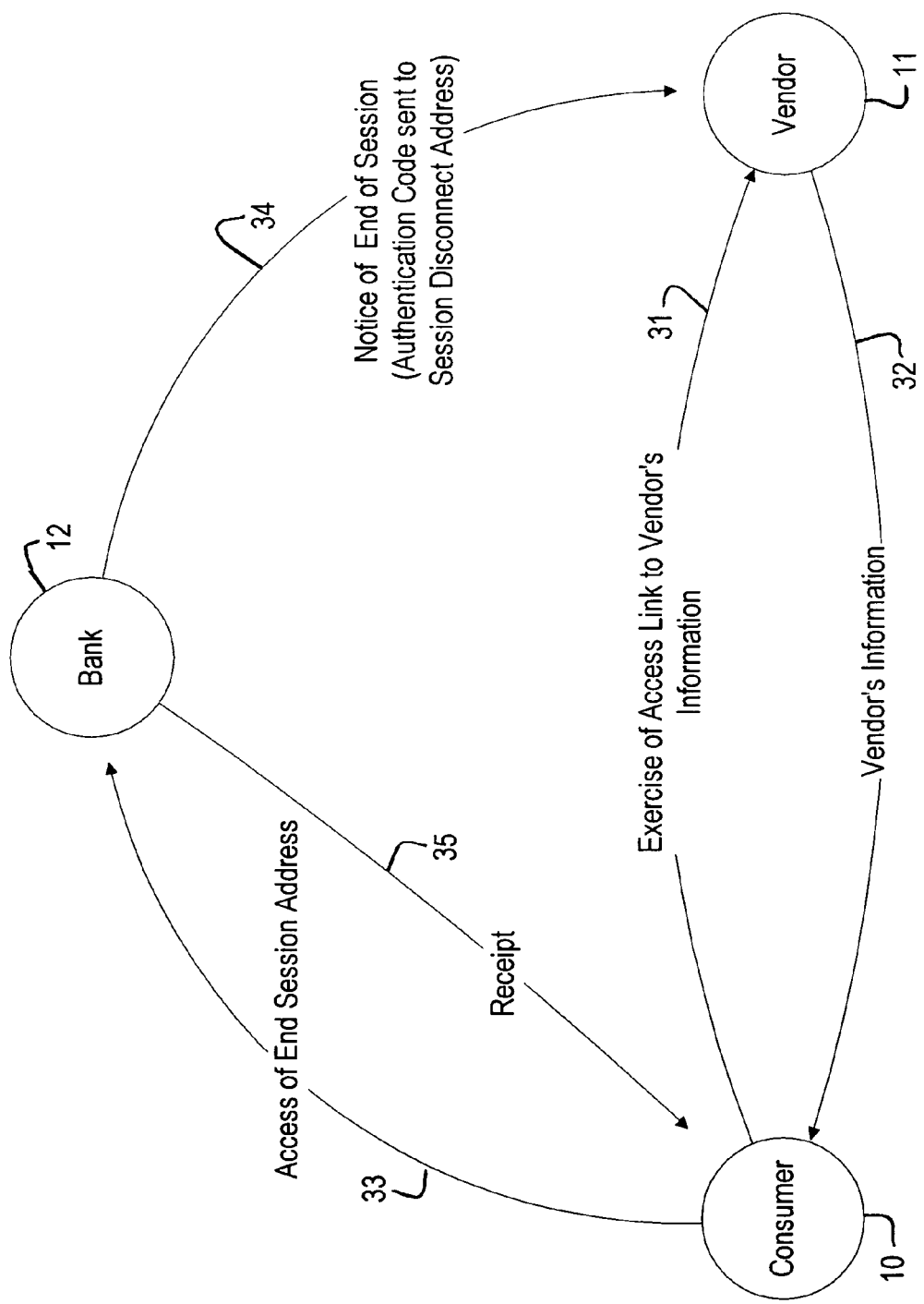
FIG. 3 is a data flow diagram showing the consumer purchasing information from the vendor.

Referring now to FIG. 3, the consumer 10 exercises one or more access links, each to a document of information to which access is made available by the vendor, as shown in data flow 31. In response to the exercise of each access link, the vendor provides to the consumer the requested information document, as shown in data flow 32. This request for information and the providing of information can continue until the maximum duration time is expired, or the consumer can terminate the access earlier, by accessing the end session address provided by the bank at the beginning of the session, this access as shown by data flow 33. If this happens, the bank sends a notice of end of session to the vendor, as shown by data flow 34.

In another aspect of the present invention, the consumer may have an account with the same bank or another bank, and may have established some pre-authorized spending limit with the bank or another bank. In that situation, the maximum duration figure provided by the bank (as part of data flow 24) is sometimes based on the spending limit the consumer has established.

At the end of the session, as shown by data flow 25, the bank notes the current time and sends a receipt to the consumer that indicates the charge made to the consumer. The notice of end of session sent to the vendor is in fact the transmission by the bank of the consumer authentication code to the session disconnect address of the vendor. The vendor then cancels the consumer authentication code and, at the vendor's option, terminates the flow of information documents to the consumer.

Thus, with the method of the present invention, the bank knows the length of time for which to bill a consumer and so can perform impartial billing services for access to information over a computer network based on the duration of access.

It is to be understood that the above described arrangements are only illustrative of the application of the principles of the present invention. In particular, it should be understood that in referring here to billing for providing services, such as providing access to information, should be construed as a method of billing for access to any sort of software, including simple textual data, for which billing for time of access is sensible.

Thus, for example, a consumer may wish to use executable software, for a period of time, in order to estimate how much life insurance the person should have according to standard estimates. Or a consumer might wish to access executable software, for a period of time, that makes available a video game or other diversion. In providing all of these kinds of services, only some of which are information in the narrow sense, the method of the present invention is of value because it facilitates billing based on time of access. And besides the specific embodiments disclosed here, numerous modifications and alternative arrangements may be devised by those skilled in the art without departing from the spirit and scope of the present invention, and the appended claims are intended to cover such modifications and arrangements.

What is claimed is:

1. A method of billing, by a third party, for access by a consumer to information made available by a vendor over a computer network, with the billing based on how long the consumer elects to access the information, the method comprising the steps of:
    a) when a consumer visits a vendor network address and decides to purchase access to information made available over the computer network by the vendor, having the consumer exercise a third-party link that will connect the consumer to the third party;
    b) having the third party provide to the consumer an exercisable start-session link for starting access to the information; and
    c) having the third party both begin timing access and redirect the consumer to the information if the consumer exercises the start-session link, wherein the third party passes to the vendor a consumer authentication code and consumer address by providing the consumer authentication code and consumer address as a parameter of the start-session link;
    wherein the third-party link and the start-session link are links on respective pages for presentation to the consumer by a browser hosted by equipment operated by the consumer.

2. A method of billing a consumer for access for a limited time to information made available by a vendor, the access provided over a computer network, the method requiring participation by a third party to mediate between the consumer and the vendor, the method comprising the steps of:
    a) having the vendor establish an account with the third party and provide to the third party a session connect address that is an address on the computer network of the information made available by the vendor;
    b) having the third party provide the vendor with a start session address that is an address on the computer network of the third party to which the vendor is to direct a consumer to start timing access by the consumer to the information made available by the vendor;
    c) having the vendor make available over the computer network a pricetag link that will connect a prospective consumer with the third party;
    d) if the consumer exercises the pricetag link, having the third party return to the consumer a pricetag page that includes a price-per-unit time for access to the information made available for access by the vendor, a maximum duration of access for which the consumer is authorized, and a link to the start session address, which is an address of the third party;
    e) if the consumer exercises the link to the start session address, having the third party return to the consumer an end session link, which the consumer can use to terminate the purchase of access to information from the vendor earlier than waiting for the maximum duration of access to expire, and an authentication code;
    f) also if the consumer exercises the link to the start session address, having the third party provide to the vendor the consumer authentication code and the consumer address by redirecting the consumer to link to the vendor and in so linking pass to the vendor a consumer authentication code and consumer address as parameters of the link, and having the third party begin billing the consumer beginning when the consumer exercised the start session link;
    g) having the vendor provide to the consumer a page, located at the session connect address of the vendor, that provides an access link to the information made available by the vendor;
    h) if the consumer exercises the access link, having the vendor provide access to the information until either the maximum duration expires, or the consumer exercises the end session link; and
    i) if the consumer exercises the end session link, which redirects the consumer to the third party, having the third party notify the vendor that the consumer access is terminated, and having the third party stop billing the consumer;
    wherein the pricetag link and the link to the start session address are links on respective pages for presentation to the consumer by a browser hosted by equipment operated by the consumer.

3. The method of claim 2, wherein when the consumer accesses the network address of the vendor, the vendor transmits to the consumer a page with the pricetag link that provides enough information to the consumer for the consumer to decide whether to look further into purchasing information from the vendor.

4. A method of billing a consumer for access for a limited time to information made available by a vendor, the access provided over a computer network, the method requiring participation by a third party to mediate between the consumer and the vendor, the method comprising the steps of:
    having the vendor establish an account with the third party and provide to the third party a session connect address that is an address on the computer network of the information made available by the vendor;
    having the third party provide the vendor with a start session address that is an address on the computer network of the third party to which the vendor is to direct a consumer to start timing access by the consumer to the information made available by the vendor;
    having the vendor make available over the computer network a pricetag link that will connect a prospective consumer with the third party; and
    having the third party start timing access based on the consumer exercising a start-session link made available by the third party for linking the consumer to the start session address;
    wherein the pricetag link and the start-session link are links on respective pages for presentation to the consumer by a browser hosted by equipment operated by the consumer; and
    wherein the third party redirects the consumer to link to the vendor upon the consumer exercising the start-session link, and passes to the vendor a consumer authentication code and consumer address as parameters of the link.

5. The method of claim 4, further comprising a step in which the third party stops timing access based on the consumer having exceeded a maximum duration of access to the information.

6. The method of claim 4, further comprising a step in which the third party stops timing access to the information when the consumer exercises an end-session link that redirects the consumer to the third party.

7. The method of claim 1, further comprising a step in which the third party stops timing access to the information based on a maximum duration of access to the information.

8. The method of claim 1, further comprising a step in which the third party provides an end session address for use by the consumer in signalling to the third party to stop timing access to the information.

9. A system for billing, by a third party, for access by a consumer to information made available by a vendor over a computer network, with the billing based on how long the consumer continues to access the information, the system comprising:
- a vendor server having a vendor network address on the computer network, and including means for providing an exercisable third party link for connecting equipment operated by the consumer to a server operated by the third party and connected to the computer network; and
- the third party server, for initiating billing and connecting the consumer equipment to a location accessible over the computer network where the information made available by the vendor resides, and including means for providing an exercisable start-session link by which the consumer indicates the consumer has begun access of the information made available by the vendor, and also means by which to initiate timing access by the consumer to the information made available by the vendor if the consumer exercises the start-session link;
- wherein the third-party link and the start-session link are links on respective pages for presentation to the consumer by a browser hosted by equipment operated by the consumer; and
- wherein the third-party provides a consumer authentication code and consumer address as parameters of the start-session link so that if the consumer exercises the start-session link the vendor receives the consumer authentication code and consumer address as parameters of the link.

10. A system for billing as in claim 9, wherein the third party server includes means for providing to the consumer an end session address for use by the consumer in ending access to the information by linking the consumer equipment to the end session address, and also includes means by which to terminate timing access to the information if the consumer links to the end session address.

11. A system for billing as in claim 9, wherein the third party server includes means for stopping timing access to the information based on the consumer having exceeded a maximum duration of access to the information.

12. A method of billing, by a third party, for access over a computer network by a consumer operating consumer equipment to information made available over the computer network by a vendor, the vendor and the third party operating respective servers connected to the computer network each of which servers has a network address, the method comprising the steps of:
- the vendor server presenting to the consumer an exercisable third-party link for connecting the consumer to the third party server; and
- the third party server presenting to the consumer equipment an exercisable start-session link for use by the consumer in starting timed access to the information and also for use by the third party as a signal for starting to time access to the information, and the third party server redirecting the consumer equipment to a location where the information resides if the consumer exercises the start-session link and passing to the vendor a consumer authentication code and consumer address as parameters of the start-session link;
- wherein the third-party link and the start-session link are links on respective pages for presentation to the consumer by a browser hosted by equipment operated by the consumer.

* * * * *